United States Patent
Sugitani (10) Patent No.: US 7,529,605 B2
(45) Date of Patent: May 5, 2009

(54) VEHICLE STEERING SYSTEM FOR SETTING STEERING REACTION WITHOUT USING DIFFERENCE BETWEEN TARGET AND ACTUAL STEERING ANGLES

(75) Inventor: Nobuo Sugitani, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 11/420,924

(22) Filed: May 30, 2006

(65) Prior Publication Data
US 2006/0289226 A1    Dec. 28, 2006

(30) Foreign Application Priority Data
Jun. 2, 2005    (JP)    ............... 2005-162394

(51) Int. Cl.
*B62D 6/00*    (2006.01)
*B62D 5/04*    (2006.01)
*G06F 19/00*   (2006.01)

(52) U.S. Cl. .................... 701/41; 701/42; 701/43; 180/443; 180/446

(58) Field of Classification Search ............ 701/41, 701/42, 43; 180/410, 443, 446
See application file for complete search history.

(56) References Cited

U.S. PATENT DOCUMENTS 5,996,724 A * 12/1999 Shimizu et al. ............ 180/446
6,308,122 B1 * 10/2001 Nishizaki et al. ............ 701/41
6,546,323 B2 * 4/2003 Deguchi et al. ............. 701/41
6,799,105 B2    9/2004 Stout et al.
7,136,732 B2 * 11/2006 Shimizu et al. ............. 701/41

FOREIGN PATENT DOCUMENTS

| DE | 103 46 146 | 5/2004 |
| EP | 1 201 528 | 5/2002 |
| EP | 1 407 959 | 4/2004 |
| EP | 1 433 691 | 6/2004 |
| EP | 1 625 993 | 2/2006 |
| JP | 2004-210024 | 7/2004 |

* cited by examiner

*Primary Examiner*—Tan Q Nguyen
(74) *Attorney, Agent, or Firm*—Rankin, Hill & Clark LLP (57) ABSTRACT

A steering system for a vehicle, includes a control operated by a driver of the vehicle; a measuring device for measuring a quantity of operation of the control by the driver; a steering section including a steering actuator for steering wheels which are mechanically independent of the control; a section for setting a target steering angle in accordance with the quantity of operation measured by the measuring device; a reaction actuator for applying a steering reactive force to the control; a section for setting a virtual steering angle based on a virtual model which represents predetermined dynamic characteristics of the steering section; and a reaction control section for setting a target reactive force in accordance with a difference between the target steering angle and the virtual steering angle, and controlling the reaction actuator based on the target reactive force.

6 Claims, 6 Drawing Sheets

VEHICLE STEERING SYSTEM FOR SETTING STEERING REACTION WITHOUT USING DIFFERENCE BETWEEN TARGET AND ACTUAL STEERING ANGLES

BACKGROUND OF THE INVENTION

1. Field of the Invention

The present invention relates to a vehicle steering system employing an SBW (steering by wire) system, in which an operation section (or controls) operated by a driver and a steering section (or mechanism) for steering steered wheels are not mechanically coupled with each other.

Priority is claimed on Japanese Patent Application No. 2005-162394, filed Jun. 2, 2005, the content of which is incorporated herein by reference.

2. Description of the Related Art

A vehicle steering system employing the SBW system has (i) a steering actuator for steering the steered wheels in accordance with actions of the driver who operates a steering wheel (i.e., a control), and (ii) a reaction actuator for providing appropriate reaction (i.e., a reactive force) for steering (i.e., steering reaction) when the driver operates the steering wheel, where the two actuators are independently controlled.

In a known method for controlling steering reaction, the reactive force for steering is generated based on a difference between a target steering angle, which is set based on operation of the steering wheel, and an actual steering angle of the wheels (see, for example, Japanese Unexamined Patent Application, First Publication No. 2004-210024). Generally, the control is performed in a manner such that the greater the difference between the target steering angle and the actual steering angle, the greater the generated reactive force is.

However, in the above conventional steering reaction control based on the above difference, the steering reaction is influenced by steering-follow-up performance which depends on dynamic characteristics of the actual steering mechanism; thus, the driver may feel uncomfortable with respect to the steering reaction.

For example, generally, in steering while the vehicle speed is very low, the output from the steering mechanism is low and the steering-follow-up performance tends to be lower. In this case, the difference between the target steering angle and the actual steering angle increases, so that a larger reactive force is generated, which may make steering feeling worse.

In addition, a large output from the steering mechanism is required when the steering mechanism has a large inertia. In such a case, when a high-speed steering operation using the steering wheel is performed, the difference between the target steering angle and the actual steering angle is large in an initial stage, and then the difference attenuates. Therefore, in the initial stage of steering, much reactive force is generated and the steering operation feels very heavy for the driver, and after that, the driver feels the termination of the reaction; therefore, the steering operation feels uncomfortable for the driver.

On the other hand, the steering system may have an assistance system for the steering operation of the driver. In an example of an assistance system, in order to prevent the action of the vehicle from becoming disordered due to disturbance such as a crosswind, an independent or an additional steering operation, not based on the driver's intention, is performed at the system side, so as to stabilize the action of the vehicle. Such a steering system is called "active steering" below.

However, in the conventional SBW system employing active steering, the difference between the target steering angle and the actual steering angle is influenced by the active steering, so that the reactive force includes a component from the active steering, thereby making the steering feeling worse.

SUMMARY OF THE INVENTION

In light of the above circumstances, an object of the present invention is to provide a vehicle steering system which is not influenced by dynamic characteristics of the steering section, and by which any steering reaction characteristic can be set, thereby improving the steering feeling.

Therefore, the present invention provides a steering system for a vehicle, comprising:

a control (e.g., a steering wheel 2 in embodiments explained later) operated by a driver of the vehicle;

an input operation measuring device (e.g., a steering angle sensor 3 in the embodiments) for measuring a quantity of operation of the control by the driver;

steered wheels (e.g., wheels 6 in the embodiment) which are mechanically independent of the control;

a steering section (e.g., a steering section 1B in the embodiments) including a steering actuator (e.g., a steering motor 10 in the embodiments) for steering the steered wheels;

a target steering angle setting section (e.g., a target steering angle setting section 21 in the embodiments) for setting a target steering angle in accordance with the quantity of operation measured by the input operation measuring device;

a reaction actuator (e.g., a reaction motor 4 in the embodiments) for applying a steering reactive force to the control;

a virtual steering angle setting section (e.g., a virtual steering control section 22 and an ideal steering model 23 in the embodiments) for setting a virtual steering angle based on a virtual model which represents predetermined dynamic characteristics of the steering section; and a reaction control section (e.g., a reaction control section 25 in the embodiments) for setting a target reactive force in accordance with a difference between the target steering angle set by the target steering angle setting section and the virtual steering angle set by the virtual steering angle setting section, and controlling the reaction actuator based on the target reactive force.

In accordance with the above structure, the reaction actuator is controlled based on the difference between the target steering angle and the virtual steering angle; thus, the reaction actuator can be controlled without being influenced by dynamic characteristics of the actual steering section. Therefore, any steering reaction characteristic can be set, thereby improving the steering feeling.

In a typical example, the steering system comprises:

a steering angle measuring device (e.g., a steering angle sensor 12 in the embodiments) for measuring an actual steering angle of the steered wheels; and a steering control section (e.g., a steering control section 27 shown in FIG. 2) for controlling the steering actuator in accordance with a difference between the virtual steering angle set by the virtual steering angle setting section and the actual steering angle measured by the steering angle measuring device.

In accordance with this structure, it is possible to decrease the value of a controlled variable of the steering actuator, thereby reducing energy consumption.

In this case, the steering system may further comprise:

a corrected steering angle setting section (e.g., a corrected steering angle setting section 26 in the embodiments) for setting a corrected steering angle for stabilizing an action of the vehicle, wherein:

the steering control section controls the steering actuator in accordance with a difference between a sum of the virtual steering angle and the corrected steering angle, and the actual steering angle.

The corrected steering angle setting section may set the corrected steering angle based on a yaw rate of the vehicle.

In another typical example, the steering system comprises:

a steering angle measuring device (e.g., a steering angle sensor 12 in the embodiments) for measuring an actual steering angle of the steered wheels; and a steering control section (e.g., a steering control section 27 shown in FIG. 6) for controlling the steering actuator in accordance with a difference between the target steering angle set by the target steering angle setting section and the actual steering angle measured by the steering angle measuring device.

Preferably, the virtual model is an ideal steering model representing ideal dynamic characteristics of the steering section which are determined in advance.

BRIEF DESCRIPTION OF THE DRAWINGS

FIGS. 4A and 4B are graphs showing examples of variation in the electric current flowing through the steering motor: FIG. 4A shows a conventional case, and FIG. 4B shows a case relating to the first embodiment

DETAILED DESCRIPTION OF THE INVENTION

Hereinafter, embodiments in accordance with the present invention will be described with reference to FIGS. 1 to 6.

First Embodiment

A first embodiment as a vehicle steering system of the present invention will be explained with reference to FIGS. 1 to 4.

Figure 1:
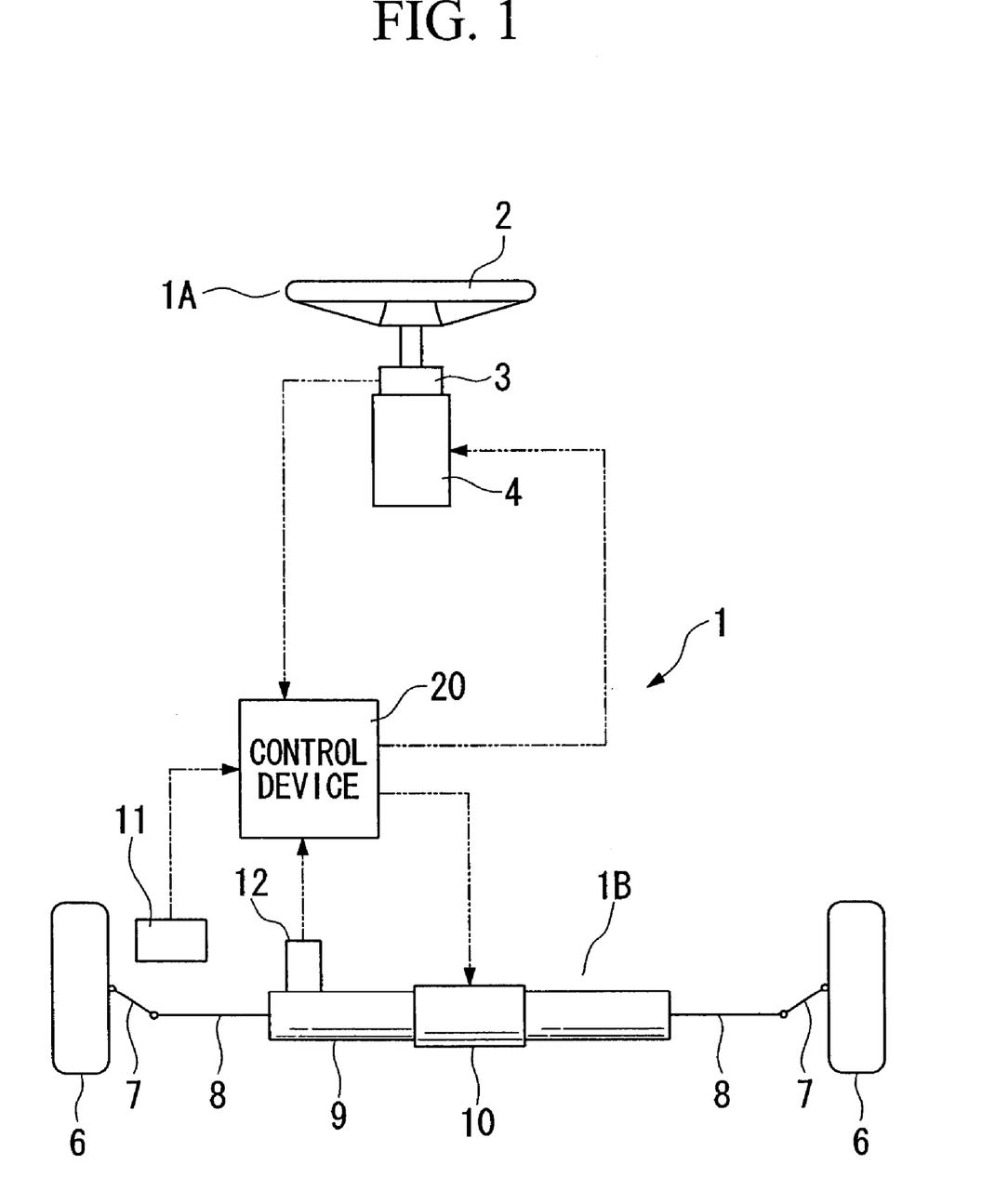
FIG. 1 is a diagram showing the general structure of a vehicle steering system as a first embodiment in accordance with the present invention.

FIG. 1 is a diagram showing the general structure of a vehicle steering system 1 of the present embodiment. As shown in FIG. 1, the vehicle steering system 1 employs an SBW system in which an operation section 1A operated by the driver and a steering section 1B for steering steered wheels are not mechanically coupled with each other.

The operation section 1A has a steering wheel 2 (i.e., a control) operated by the driver, a steering angle sensor 3 (i.e., an input operation measuring device) for measuring a steering angle of the steering wheel 2, and a reaction motor 4 (i.e., a reaction actuator) for applying steering reaction (i.e., reactive force) to the steering wheel 2.

The steering section 1B has a rack (shaft) 9 to which right and left wheels 6 (i.e., steered wheels) are coupled via steering arms 7 and tie rods 8, a steering motor 10 (i.e., a steering actuator) for steering the wheels 6 by driving the rack 9 along the axis thereof, and a steering angle sensor 12 (i.e., a steering angle measuring device) for measuring a steering angle (i.e., an actual steering angle) of the wheels 6, which is an angle measured from the axis of the rack 9.

The vehicle, in which the vehicle steering system 1 is provided, also has a yaw rate sensor 11 (i.e., a yaw rate measuring device or a vehicle state detecting device) for measuring a yaw rate of the vehicle, and an electronic control device 20 for controlling the reaction motor 4 and the steering motor 10.

The steering angle sensor 3 outputs an electrical signal corresponding to the measured steering angle of the steering wheel 2, the yaw rate sensor 11 outputs an electrical signal corresponding to the measured yaw rate, and the steering angle sensor 12 outputs an electrical signal corresponding to the measured steering angle of the wheels 6. Each electrical signal is output to the electronic control device 20.

Figure 2:
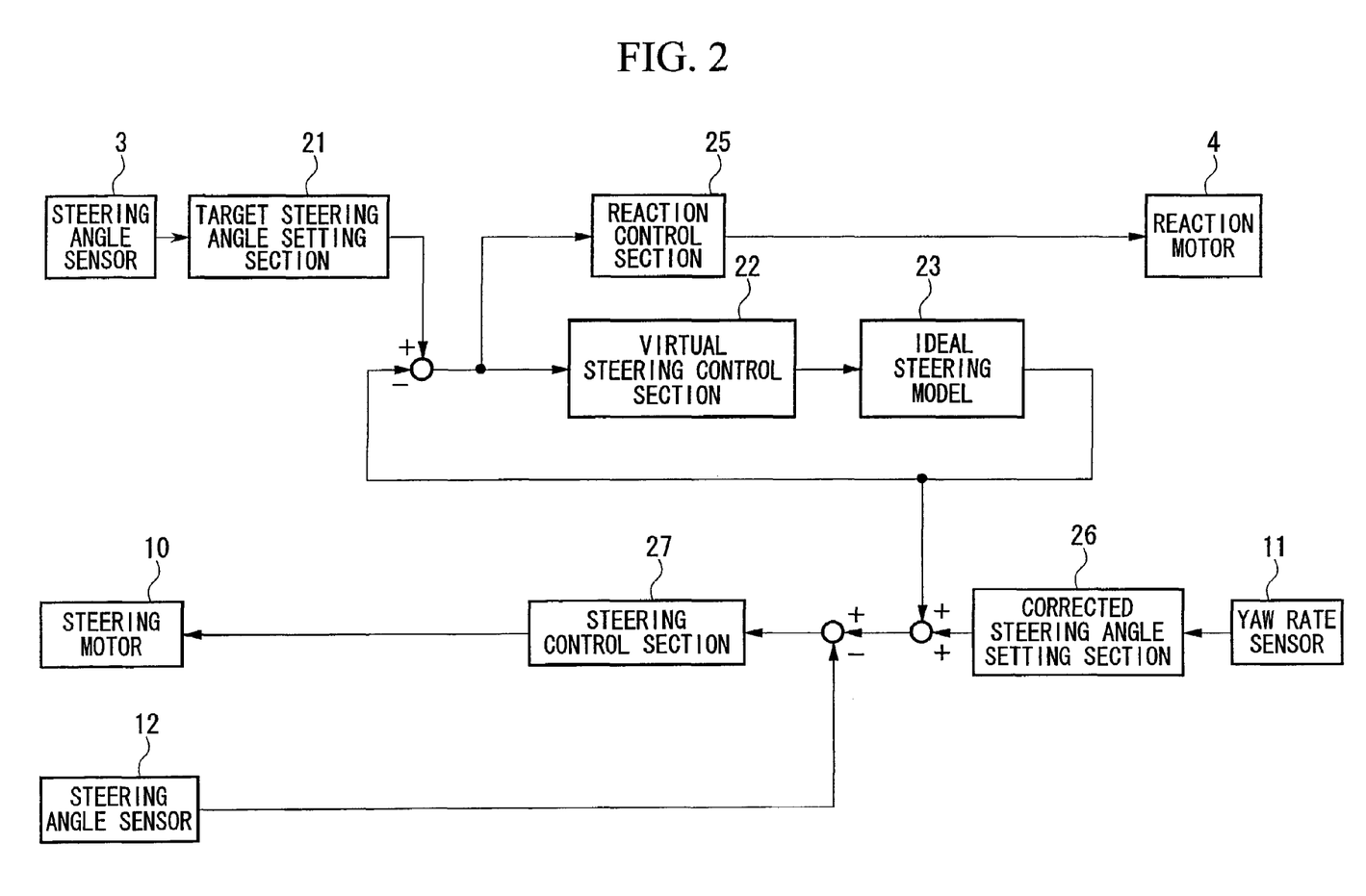
FIG. 2 is a control block diagram showing steering and reaction control performed by the vehicle steering system in the first embodiment.

The steering and reaction control of the present embodiment will be explained with reference to a control block diagram in FIG. 2.

The electronic control device 20 has a target steering angle setting section 21, a virtual steering control section 22, an ideal steering model 23 (i.e., a processing section using an ideal model), a reaction control section 25, a corrected steering angle setting section 26, and a steering control section 27. The control device 20 can respectively and independently control the reaction motor 4 and the steering motor 10.

The target steering angle setting section 21 sets a target steering angle for the wheels 6, based on the steering angle of the steering wheel 2 which is measured by the steering angle sensor 3 and which also includes (an indication of) steering direction.

The virtual steering control section 22 controls a driving voltage applied to the ideal steering model 23, and performs non-integral control based on a difference between the target steering angle set by the target steering angle setting section 21 and an output (i.e., a virtual steering angle, explained later) of the ideal steering model 23, so that the above difference has an optimum value ($\neq 0$) suitable for the present running state of the vehicle.

The ideal steering model 23 represents ideal dynamic characteristics of the steering section of the vehicle, which are determined in advance. From the ideal steering model 23, the virtual steering angle is output, which is obtained when a steering motor of the ideal steering model 23 (called a "virtual steering motor" hereinbelow) is driven using a driving voltage controlled by the virtual steering control section 22. In the first embodiment, the virtual steering control section 22 and the ideal steering model 23 function as a virtual steering angle setting section.

Figure 3:
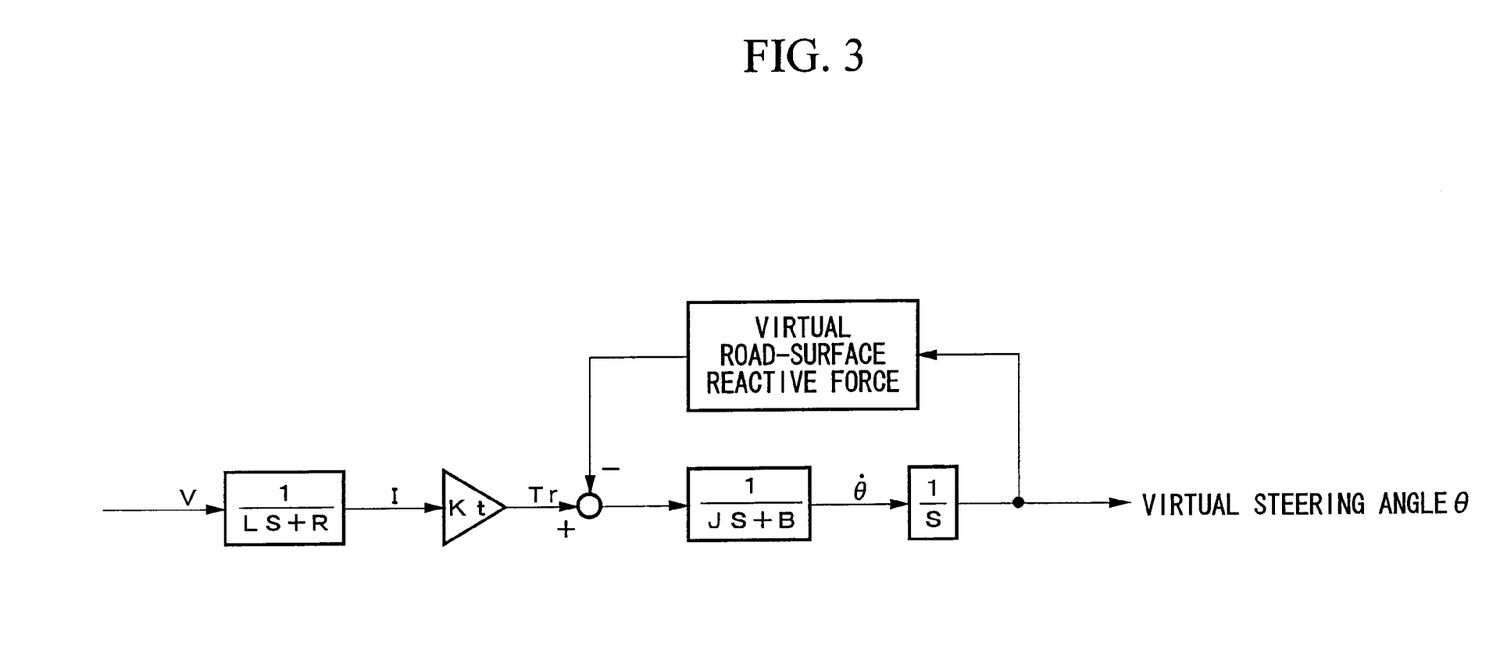
FIG. 3 is a block diagram showing an example of processing performed in the ideal steering model.

FIG. 3 shows an example of processing performed in the ideal steering model 23. First, a driving current 1 is computed based on the driving voltage output from the virtual steering control section 22, and reactance LS and circuit resistance R of the virtual steering motor. Motor torque Tr of the virtual steering motor is then computed by multiplying the driving current 1 by a predetermined coefficient. A virtual steering angular velocity $d\theta/dt$ is computed based on (i) a difference between the motor torque Tr and a virtual road-surface reactive force, (ii) an inertia force of the virtual steering motor, and (iii) a virtual mechanical loss (corresponding to a virtual frictional force). The virtual steering angular velocity $d\theta/dt$ is then temporarily integrated so as to compute the virtual steering angle $\theta$. The virtual road-surface reactive force is computed in accordance with the virtual steering angle $\theta$, and the virtual road-surface reactive force is fed back in feedback control.

In the above processing, the virtual road-surface reactive force may be computed based not only on the virtual steering angle θ, but also on an additional parameter such as vehicle speed or a coefficient of road surface friction.

Based on a difference between the target steering angle set by the target steering angle setting section and the virtual steering angle θ output from the ideal steering model 23, the reaction control section 25 sets a target reactive force with respect to the steering wheel 2, and performs electric current control (i.e., duty-ratio control) of the reaction motor 4 in accordance with the target reactive force.

Accordingly, in the reaction control of the vehicle steering system, the difference between the target steering angle and the actual steering angle of the wheels 6 is not used for setting the target reactive force; thus, the target reactive force is not influenced by dynamic characteristics of the steering section 1B. In addition, desired reaction characteristics can be set by appropriately setting the ideal steering model 23. Therefore, steering feeling can be greatly improved in comparison with the case of using a conventional system.

For example, even when steering is performed at very low speed and output from the steering section 1B is insufficient, no undesirable influence is imposed on the steering feeling.

Based on the yaw rate of the vehicle, which is measured by the yaw rate sensor 11, the corrected steering angle setting section 26 computes a corrected steering angle for stabilizing the action of the vehicle when the vehicle receives disturbance such as a crosswind. That is, the corrected steering angle setting section 26 computes a correction value for active steering, so as to stabilize the action of the vehicle, where the correction value is independent of the driver's intention. The output of the corrected steering angle setting section 26 does not influence the setting of the target reactive force at all; thus, the reactive force with respect to steering does not include a reaction component (i.e., a reactive force component) from the active steering. Therefore, the steering feeling can be greatly improved in comparison with the case of using a conventional system.

The virtual steering angle output from the ideal steering model 23 and the corrected steering angle computed by the corrected steering angle setting section 26 are added together so as to obtain a total target steering angle, and the steering control section 27 performs current control (i.e., duty-ratio control) of the steering motor 10 so that a difference between the total target steering angle and the actual steering angle measured by the steering angle sensor 12 becomes zero. That is, the steering control section 27 performs complete integral control.

As described above, also when the current control of the steering motor 10 is performed by the steering control section 27, the output from the ideal steering model 23 (i.e., the virtual steering angle) is used instead of the target steering angle set by the target steering angle setting section 21, thereby reducing the current flowing through the steering motor 10 (that is, a controlled variable of the steering actuator). Therefore, it is possible to reduce electric current consumption and to greatly reduce sound generated by the steering motor 10.

Figure 4A:
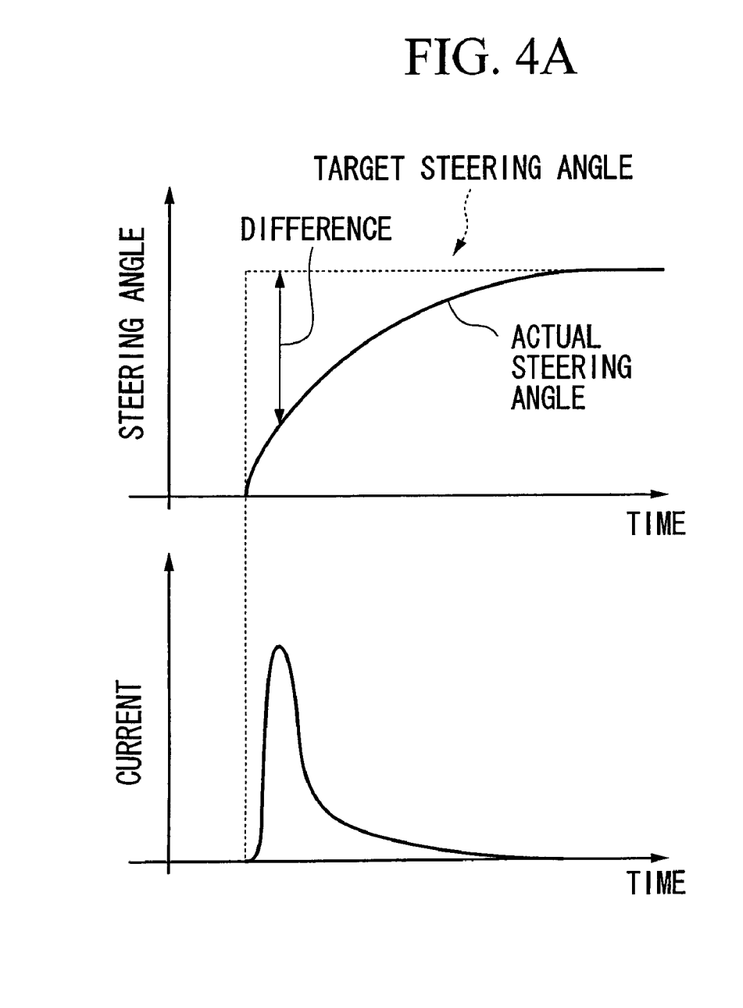
Figure 4B:
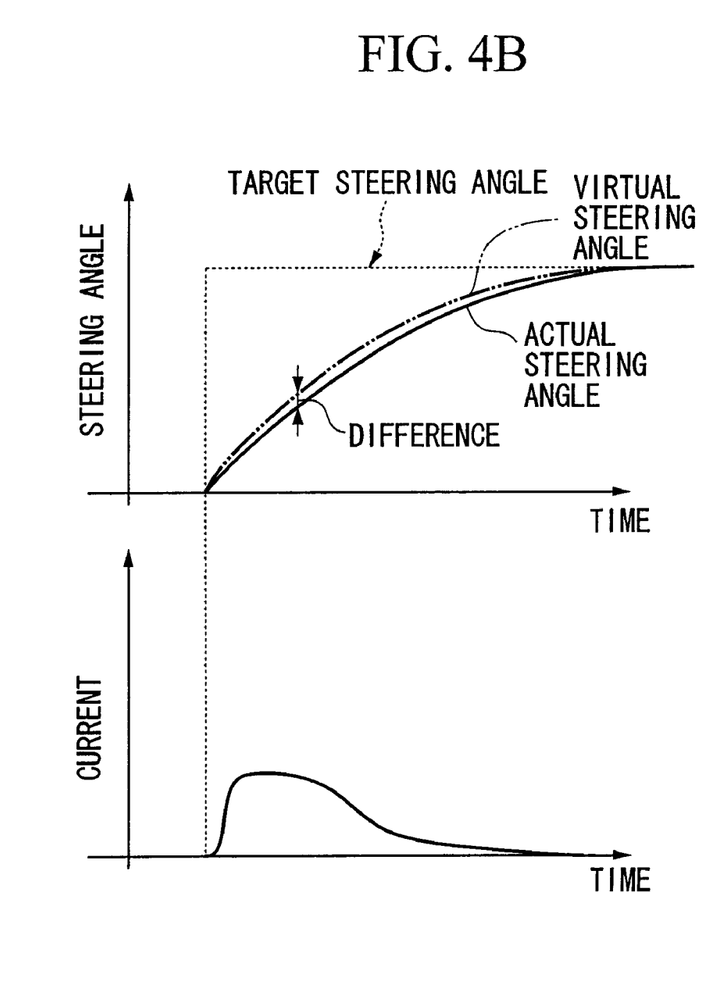

FIGS. 4A and 4B are graphs showing results of comparison between the steering system of the first embodiment and a conventional steering system (which also has a steering motor 10) with respect to variation in the electric current flowing through the steering motor 10 when the target steering angle is suddenly increased.

FIG. 4A shows a conventional case in which the current of the steering motor 10 is controlled based on a difference between the target steering angle and the actual steering angle. In this case, the difference is large; thus, a large current flows through the steering motor 10.

FIG. 4B shows a case relating to the first embodiment, in which the current of the steering motor 10 is controlled based on a difference between the output (i.e., the virtual steering angle) from the ideal steering model and the actual steering angle. In this case, the difference is small; thus, the current flowing through the steering motor 10 is less than the current flowing through the steering motor 10 in the conventional case.

Accordingly, in the steering system of the first embodiment, the steering section 1B follows, not the target steering angle set by the target steering angle setting section 21, but the output (i.e., the virtual steering angle) from the ideal steering model 23; thus, design and installation of the steering section 1B can be more accurately performed based on a quantitative method.

Second Embodiment

Figure 5:
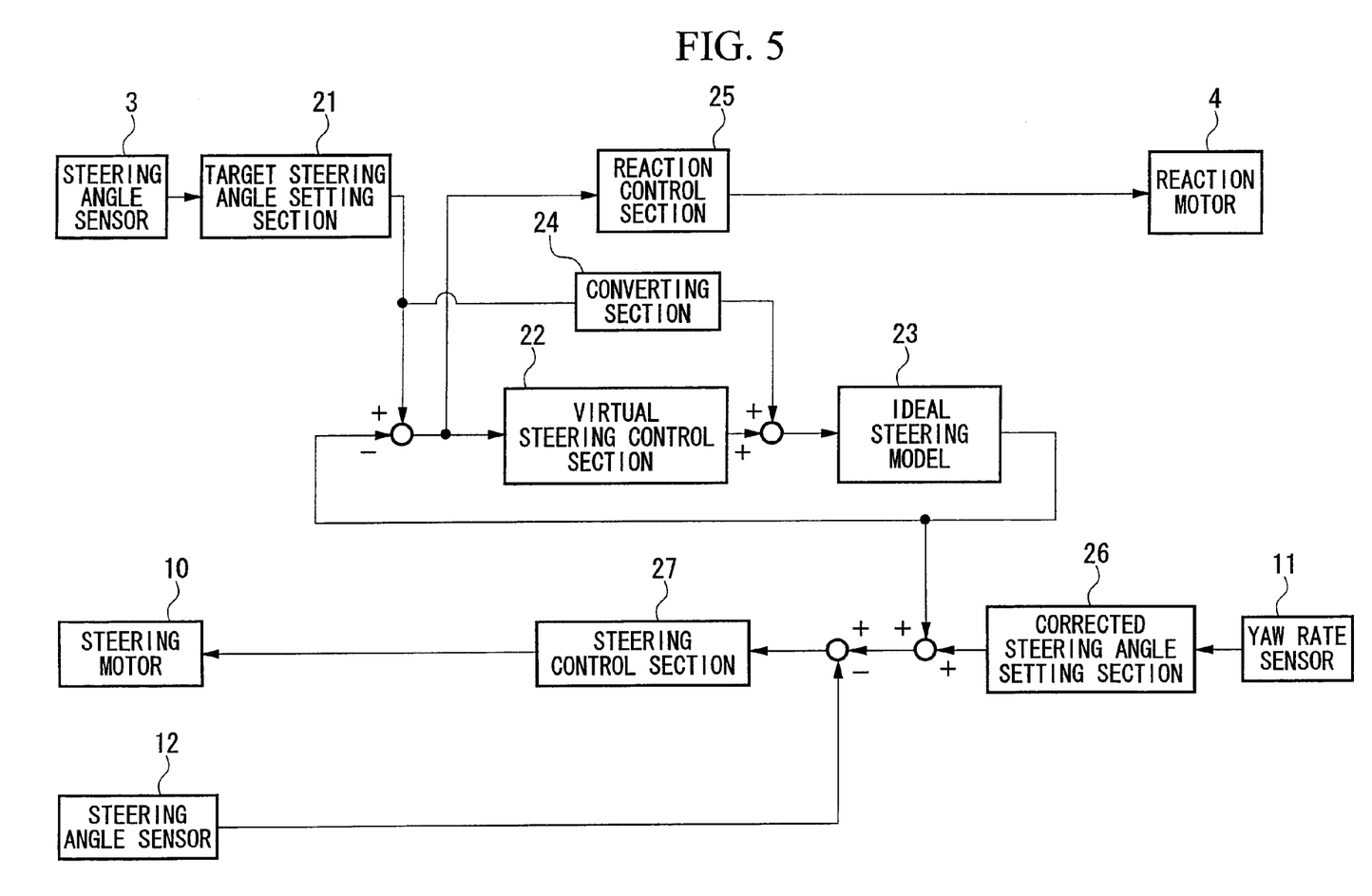
FIG. 5 is a control block diagram showing steering and reaction control performed by a vehicle steering system as a second embodiment in accordance with the present invention.

Next, steering and reaction control of a vehicle steering system as a second embodiment in accordance with the present invention will be explained with reference to a control block diagram of FIG. 5. The structure of the general system is the same as that of the first embodiment, and explanations thereof are omitted, reference to FIG. 1 being urged instead.

In comparison with the first embodiment, the steering and reaction control of the vehicle steering system of the second embodiment has a distinctive method of computing the driving voltage with respect to the ideal steering model 23. The control device 20 of the second embodiment has a converting section 24 for converting the target steering angle set by the target steering angle setting section 21 to a voltage corresponding to the target steering angle. The voltage corresponding to the target steering angle is a driving voltage for the ideal steering model 23, which is necessary for making the output (i.e., the ideal steering angle) from the ideal steering model 23 coincide with the target steering angle.

In the second embodiment, (i) the voltage controlled by the virtual steering control section 22 based on the difference between the target steering angle and the virtual steering angle, and (ii) the voltage corresponding to the target steering angle, which is obtained by the conversion performed by the converting section 24 are added together, and the voltage obtained by the addition is used as the driving voltage for the ideal steering model 23. The steering and reaction control other than the above method of computing the driving voltage for the ideal steering model 23 is the same as that of the first embodiment, and explanations thereof are omitted.

Similarly to in the first embodiment, in the reaction control of the second embodiment, the difference between the target steering angle and the actual steering angle of the wheels 6 is not referred to when setting the target reactive force. Therefore, the target reactive force is not influenced by the dynamic characteristics of the steering section 1B, and desired reaction characteristics can be set by appropriately setting the ideal steering model 23. Therefore, steering feeling can be greatly improved in comparison with the case of using a conventional system.

Also similarly to in the first, embodiment, in the second embodiment, the output of the corrected steering angle setting section 26 does not influence the setting of the target reactive force at all; thus, the reactive force with respect to steering does not include a reaction component from the active steering. Therefore, the steering feeling can be extremely improved in comparison with the case of using a conventional system.

Also similarly to in the first embodiment, in the second embodiment, when the steering control section 27 performs current control of the steering motor 10, the output (i.e., the virtual steering angle) output from the ideal steering model 23 is used instead of the target steering angle set by the target steering angle setting section 21. Therefore, the current flowing through the steering motor 10 can be reduced, and accordingly, it is possible to reduce electric current consumption and to greatly reduce sound generated by the steering motor 10.

Third Embodiment

Figure 6:
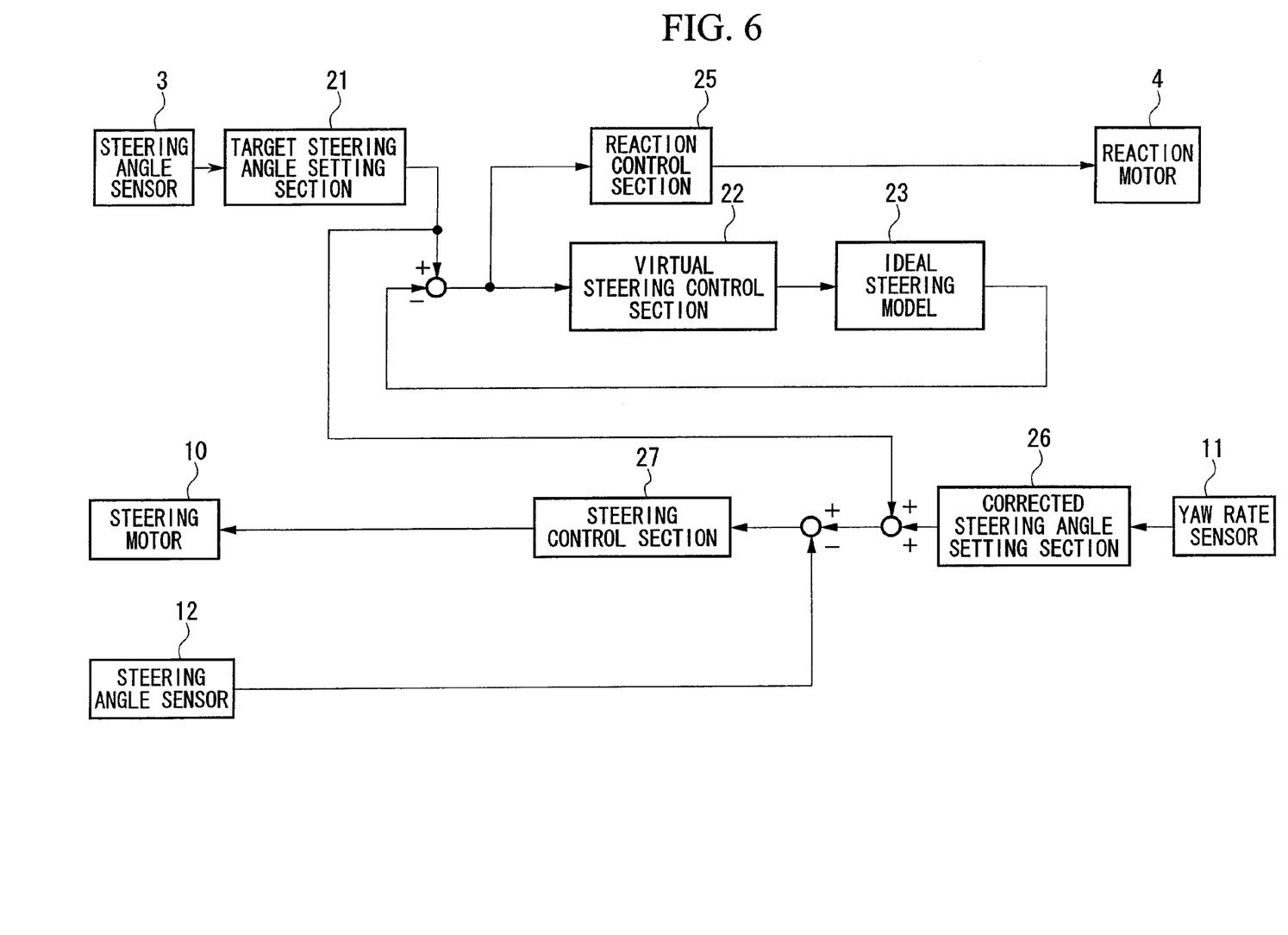
FIG. 6 is a control block diagram showing steering and reaction control performed by a vehicle steering system as a third embodiment in accordance with the present invention.

Next, steering and reaction control of a vehicle steering system as a third embodiment in accordance with the present invention will be explained with reference to a control block diagram of FIG. 6. The structure of the general system is the same as that of the first embodiment, and explanations thereof are omitted, reference to FIG. 1 being urged instead.

In comparison with the first embodiment, the steering and reaction control of the vehicle steering system of the third embodiment has a distinctive method of computing the total target steering angle (this method is the only part different from the first embodiment). In the steering system of the first embodiment, the total target steering angle is computed by adding the ideal steering angle output from the ideal steering model 23 and the corrected steering angle computed by the corrected steering angle setting section 26 together. In contrast, in the third embodiment, the total target steering angle is computed by adding the target steering angle set by the target steering angle setting section 21 and the corrected steering angle computed by the corrected steering angle setting section 26 together. The steering and reaction control other than the above method of computing the total steering angle is the same as that of the first embodiment, and explanations thereof are omitted.

Similarly to in the first embodiment, in the reaction control of the third embodiment, the difference between the target steering angle and the actual steering angle of the wheels 6 is not referred to when setting the target reactive force. Therefore, the target reactive force is not influenced by the dynamic characteristics of the steering section 1B, and desired reaction characteristics can be set by appropriately setting the ideal steering model 23. Therefore, steering feeling can be greatly improved in comparison with the case of using a conventional system. For example, even when steering is performed at very low speed and the output from the steering section 1B is insufficient, no undesirable influence is imposed on the steering feeling.

In addition, the output of the corrected steering angle setting section 26 does not influence the setting of the target reactive force at all; thus, the reactive force with respect to steering does not include a reaction component from the active steering. Therefore, the steering feeling can be greatly improved in comparison with the case using a conventional system.

Other Embodiments

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the control is not limited to the steering wheel, and may be a joystick.

In the above-described embodiments, the quantity of operation of the steering wheel (i.e., the control) is evaluated as the steered angle. However, a steering torque (i.e., a quantity indicating the operation state) may be used as the quantity of operation, so as to control the steering actuator.

Also in the above-described embodiments, the vehicle state measuring device is implemented as a yaw rate sensor, and the vehicle state is detected based on a measured yaw rate. However, the vehicle state measuring device may be implemented by a lateral acceleration sensor or the like, and the vehicle state may be detected based on a measured lateral acceleration or the like.

What is claimed is:

1. A steering system for a vehicle, comprising:
a control operated by a driver of the vehicle;
an input operation measuring device for measuring a quantity of operation of the control by the driver;
steered wheels which are mechanically independent of the control;
a steering section including a steering actuator for steering the steered wheels;
a target steering angle setting section for setting a target steering angle in accordance with the quantity of operation measured by the input operation measuring device;
a reaction actuator for applying a steering reactive force to the control;
a virtual steering angle setting section for setting a virtual steering angle based on a virtual model which represents predetermined dynamic characteristics of the steering section; and
a reaction control section for setting a target reactive force in accordance with a difference between the target steering angle set by the target steering angle setting section and the virtual steering angle set by the virtual steering angle setting section, and controlling the reaction actuator based on the target reactive force.

2. The steering system in accordance with claim 1, further comprising:
a steering angle measuring device for measuring an actual steering angle of the steered wheels; and
a steering control section for controlling the steering actuator in accordance with a difference between the virtual steering angle set by the virtual steering angle setting section and the actual steering angle measured by the steering angle measuring device.

3. The steering system in accordance with claim 2, further comprising:
a corrected steering angle setting section for setting a corrected steering angle for stabilizing an action of the vehicle, wherein:
the steering control section controls the steering actuator in accordance with a difference between a sum of the virtual steering angle and the corrected steering angle, and the actual steering angle.

4. The steering system in accordance with claim 3, wherein the corrected steering angle setting section sets the corrected steering angle based on a yaw rate of the vehicle.

5. The steering system in accordance with claim 1, further comprising:
a steering angle measuring device for measuring an actual steering angle of the steered wheels; and
a steering control section for controlling the steering actuator in accordance with a difference between the target steering angle set by the target steering angle setting section and the actual steering angle measured by the steering angle measuring device.

6. The steering system in accordance with claim 1, wherein the virtual model is an ideal steering model representing ideal dynamic characteristics of the steering section which are determined in advance.

* * * * *